(12) United States Patent
Chen et al.

(10) Patent No.: US 9,430,217 B2
(45) Date of Patent: Aug. 30, 2016

(54) METHOD AND APPARATUS FOR PATCHING

(71) Applicant: International Business Machines Corporation, Armonk, NY (US)

(72) Inventors: Chun Hai Chen, Beijing (CN); Yi Ge, Beijing (CN); Li Li, Beijing (CN); Liang Liu, Beijing (CN); Jun Mei Qu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/427,454

(22) PCT Filed: May 23, 2013

(86) PCT No.: PCT/CN2013/076140
§ 371 (c)(1),
(2) Date: Mar. 11, 2015

(87) PCT Pub. No.: WO2014/040424
PCT Pub. Date: Mar. 20, 2014

(65) Prior Publication Data
US 2015/0220320 A1 Aug. 6, 2015

(30) Foreign Application Priority Data
Sep. 12, 2012 (CN) .......................... 2012 1 0337811

(51) Int. Cl.
G06F 9/445 (2006.01)
G06F 9/44 (2006.01)
G06F 9/455 (2006.01)

(52) U.S. Cl.
CPC . *G06F 8/65* (2013.01); *G06F 8/68* (2013.01); *G06F 9/44536* (2013.01); *G06F 9/45533* (2013.01)

(58) Field of Classification Search
None
See application file for complete search history.

(56) References Cited

U.S. PATENT DOCUMENTS 7,305,672 B2 12/2007 Vincent
8,286,238 B2 10/2012 Durham et al.
(Continued)

FOREIGN PATENT DOCUMENTS

CN 1906575 A 1/2007
CN 101154187 A 4/2008
(Continued)

OTHER PUBLICATIONS

Zhou et al., "Always Up-to-Date-Scalable Offline Patching of VM Images in a Compute Cloud," IBM Research Report, RC24956 (W1003-034), Mar. 11, 2010, Computer Science, pp. 1-20.
(Continued)

*Primary Examiner* — Daxin Wu
(74) *Attorney, Agent, or Firm* — Scully, Scott, Murphy & Presser, P.C.; David Quinn, Esq.

(57) ABSTRACT

A method for patching an application running in a computing system, the method comprising: in response to that there is a need to patch a first content and the first content has been in the memory, distinguishing between a new content and an old content, the new content being the patched first content, the old content being the first content that has been in the memory; and in response to that the new content is loaded to the memory, mapping to the new content a new process that needs to apply the first content, wherein the new process comprises a process that is started after loading the new content to the memory. An apparatus for patching an application is further disclosed. With the technical solution provided by the present invention, it is possible to perform dynamic patching to a virtual machine or a physical machine without stopping a running process.

13 Claims, 7 Drawing Sheets

(56) References Cited

U.S. PATENT DOCUMENTS

| | | | |
|---|---|---|---|
| 8,464,241 B2 | 6/2013 | Hayton | |
| 2004/0015956 A1* | 1/2004 | Barfield | G06F 8/62 717/174 |
| 2006/0184937 A1 | 8/2006 | Abels et al. | |
| 2007/0006201 A1* | 1/2007 | Axnix | G06F 9/44521 717/162 |
| 2008/0022376 A1 | 1/2008 | Ke et al. | |
| 2008/0083030 A1* | 4/2008 | Durham | G06F 8/67 726/22 |
| 2008/0271017 A1 | 10/2008 | Herington | |
| 2009/0259999 A1* | 10/2009 | Srinivasan | G06F 8/62 717/170 |
| 2009/0292737 A1* | 11/2009 | Hayton | G06F 8/68 |
| 2010/0287544 A1 | 11/2010 | Bradfield et al. | |
| 2011/0004564 A1* | 1/2011 | Rolia | G06Q 10/06 705/348 |
| 2011/0265076 A1 | 10/2011 | Thorat et al. | |
| 2011/0271266 A1* | 11/2011 | Kreft | G06F 9/44505 717/168 |
| 2012/0066484 A1* | 3/2012 | Yin | G06F 8/67 712/244 |
| 2012/0102480 A1* | 4/2012 | Hopmann | G06F 8/67 717/172 |
| 2012/0110237 A1 | 5/2012 | Li et al. | |
| 2012/0124581 A1* | 5/2012 | Nitta | G06F 8/65 718/1 |
| 2012/0198431 A1 | 8/2012 | Lin | |

FOREIGN PATENT DOCUMENTS

| | | |
|---|---|---|
| CN | 101609419 A | 12/2009 |
| CN | 102037444 A | 4/2011 |
| CN | 102073529 A | 5/2011 |
| CN | 102081552 A | 6/2011 |
| CN | 102571906 A | 7/2012 |
| GB | 2 451 574 A | 2/2009 |

OTHER PUBLICATIONS

Soundararajan et al., "The Impact of Management Operations on the Virtualized Datacenter," ISCA'10, Jun. 19-23, 2010, Saint-Malo, France, pp. 326-337.

Chieu, et al., "Virtual Machines with Sharable Operating System," Proceeding SPLASH'11, Proceedings of teh ACM International Conference Companion on Object Oriented Programming Systems Languages and Applications Companion, Oct. 22-27, 2011, Portland, Oregon, USA, pp. 109-114.

International Search Report, PCT/CN2013/076140.

Official Action and Search Report dated Apr. 6, 2016, received from the Chinese Patent Office.

* cited by examiner

METHOD AND APPARATUS FOR PATCHING

CROSS-REFERENCE TO RELATED APPLICATIONS

This application is based on and claims the benefit of priority from commonly-owned Chinese Patent Application 2012-10337811.1, filed on Sep. 12, 2012. This is a U.S. National Stage under 35 U.S.C 371 of the International Application PCT/CN2013/076140, filed May 23, 2013.

TECHNICAL FIELD

The present invention relates to the computer field, and more specifically, to a method and apparatus for patching.

BACKGROUND

With the continuous enrichment of software applications, there is a growing demand for patching software applications. As it is inevitable that software applications have security vulnerabilities or lack of function, software applications need to be patched for improvement.

Not only software applications but also operating systems need to be patched continuously so as to fix security bugs or enhance functions. Moreover, viruses generally spread very fast and widely. In order to avoid virus infection, operating systems or software applications need to be patched in time.

However, current patching approaches require running applications to stop, which will bring inconvenience to usage. If running applications do not stop, then they cannot be patched in time.

SUMMARY

In order to patch without stopping applications, embodiments of the present invention provide methods and apparatuses for patching.

According to one aspect of the present invention, there is provided a method for patching, comprising: in response to that there is a need to patch a first content and the first content has been in the memory, distinguishing between a new content and an old content, the new content being the patched first content, the old content being the first content that has been in the memory; and in response to that the new content is loaded to the memory, mapping to the new content a new process that needs to apply the first content, wherein the new process comprises a process that is started after loading the new content to the memory.

According to another aspect of the present invention, there is provided a method for patching, comprising: in response to that the number of virtual machines needing to patch a first content is more than 1, scheduling for patching so that n of the virtual machines first perform the operation of patching the first content, wherein the virtual machines needing to patch the first content are located on the same physical machine, and the number of the virtual machines needing to patch the first content is n+m, both n and m being natural numbers; receiving a notification for notifying that at least one of the n virtual machines is already in a first state, wherein the first state comprises any state from loading the patched first content to the memory until completing the patching operation; and in response to receipt of the notification, scheduling at least one of m virtual machines other than the n virtual machines to perform the operation of patching the first content, so that the at least one of the m virtual machines performs the patching operation by using the patched first content that is loaded to the memory.

According to another aspect of the present invention, there is provided a method for patching, comprising: receiving an indication for indicating that a current virtual machine needs to patch; obtaining a new memory space for saving a patched first content, the new memory space comprising a memory space that does not overlap with a memory space for saving an unpatched first content; sending a first notification at least comprising an address of the new memory space; sending a second notification for notifying that the current virtual machine is already in a first state, the first state comprising any state from loading the patched first content to the memory space until completing the patching operation; and performing the patching operation on the current virtual machine according to the patched first content in the new memory space.

According to another aspect of the present invention, there is provided a method for patching, comprising: receiving an indication for indicating that a current virtual machine needs to patch; learning a memory space for saving a patched first content, wherein the learned memory space is a memory space that is allocated to another virtual machine located on the same physical machine as the current virtual machine; and performing the patching operation on the current virtual machine according to the patched first content in the learned memory space.

According to another aspect of the present invention, there is provided an apparatus for patching, comprising: a distinguishing module configured to, in response to that there is a need to patch a first content and the first content has been in the memory, distinguish between a new content and an old content, the new content being the patched first content, the old content being the first content that has been in the memory; and a mapping module configured to, in response to that the new content is loaded to the memory, map to the new content a new process that needs to apply the first content, wherein the new process comprises a process that is started after loading the new content to the memory.

According to another aspect of the present invention, there is provided an apparatus for patching, comprising: a first scheduling module configured to, in response to that the number of virtual machines needing to patch a first content is more than 1, schedule for patching so that n of the virtual machines first perform the operation of patching the first content, wherein the virtual machines needing to patch the first content are located on the same physical machine, and the number of the virtual machines needing to patch the first content is n+m, both n and m being natural numbers; a receiving module configured to receive a notification for notifying that at least one of the n virtual machines is already in a first state, wherein the first state comprises any state from loading the patched first content to the memory until completing the patching operation; and a second scheduling module configured to, in response to receipt of the notification, schedule at least one of m virtual machines other than the n virtual machines to perform the operation of patching the first content, so that the at least one of the m virtual machines performs the patching operation by using the patched first content that is loaded to the memory.

According to another aspect of the present invention, there is provided an apparatus for patching, comprising: a receiving module configured to receive an indication for indicating that a current virtual machine needs to patch; an obtaining module configured to obtain a new memory space for saving a patched first content, the new memory space comprising a memory space that does not overlap with a memory space for saving an unpatched first content; a sending module configured to send a first notification at least comprising an address of the new memory space, and to send a second notification for notifying that the current virtual machine is already in a first state, the first state comprising any state from loading the patched first content to the memory space until completing the patching operation; and a patching module configured to perform the patching operation on the current virtual machine according to the patched first content in the new memory space.

According to another aspect of the present invention, there is provided an apparatus for patching, comprising: a receiving module configured to receive an indication for indicating that a current virtual machine needs to patch; a learning module configured to learn a memory space for saving a patched first content, wherein the learned memory space is a memory space that is allocated to another virtual machine located on the same physical machine as the current virtual machine; and a patching module configured to perform the patching operation on the current virtual machine according to the patched first content in the learned memory space.

The technical solution provided by the present invention can perform dynamic patching without stopping running applications.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
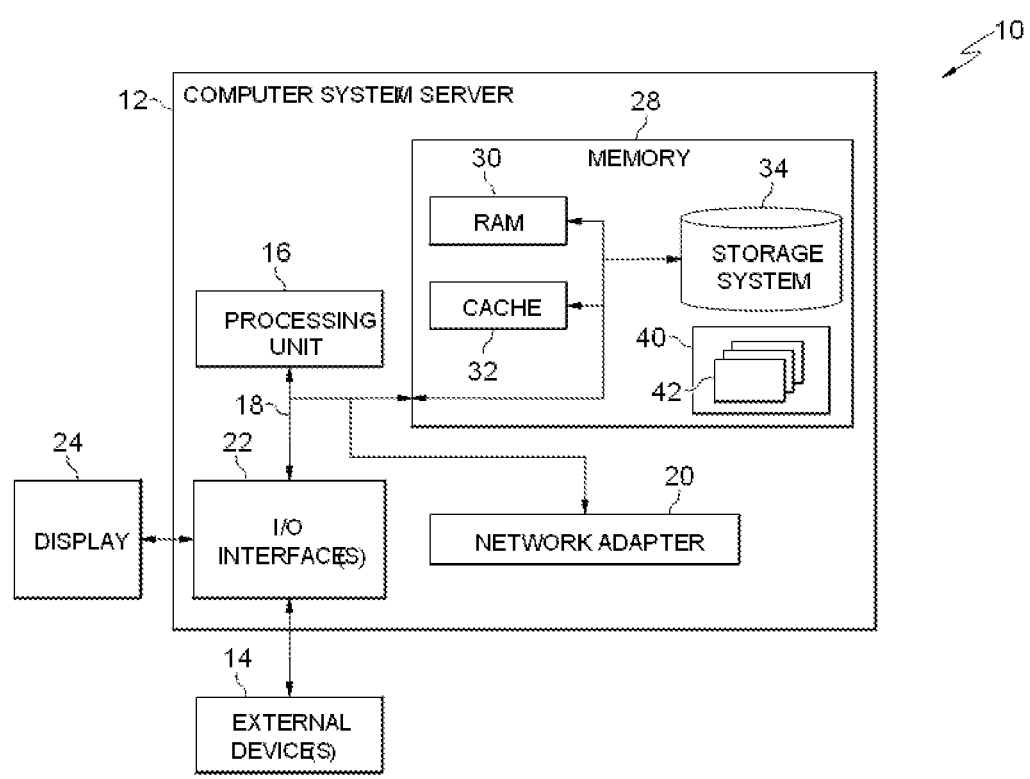
FIG. 1 shows an exemplary computer system/server 12 which is applicable to implement embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA programming language, SMALLTALK programming language, C++programming language or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
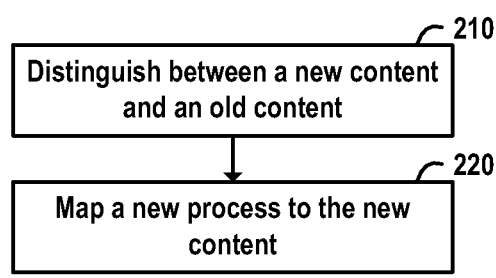
FIG. 2 shows a schematic flowchart of a method for patching according to embodiments of the present invention.

With reference now to FIG. 2, this figure shows a method for patching provided by an embodiment of the present invention. The method comprises: a step 210 of, in response to that there is a need to patch a first content and the first content has been in the memory, distinguishing between a new content and an old content, the new content being the patched first content, the old content being the first content that has been in the memory; a step 220 of, in response to the new content being loaded to the memory, mapping to the new content a new process that needs to apply the first content, wherein the new process comprises a process that is started after the new content is loaded to the memory.

In the prior art, if a to-be-patched content has been loaded to the memory, since directly modifying a content in the memory will cause abnormity in a process mapped to the content, all processes mapped to the content will be shut down. After a patched content is loaded to the memory, a process mapped to the content may be re-started so that it is mapped to the patched memory. Apparently the solution provided by the prior art needs to shut down processes so as to perform patching operations, which might bring about usage inconvenience to users. If a process cannot be shut down temporarily, then patching operations cannot be performed; that is, if a new process is started, then an old content is still used, which results in that it is impossible to add a function or plug a security loophole by patching. With the technical solution provided by this embodiment, if a to-be-patched content has been loaded to the memory, then by distinguishing between a new content and an old content, the patched content is also loaded to the memory, a new process is mapped to the new content, and an old process still uses the old content. In this manner, when a process is newly started, the patched content may be used without force-shutting a running process down, so that the operation of patching the first content is completed.

In one embodiment of the present invention, the first content may comprise a library file. For example, the library file may comprise at least one of a Dynamic Link Library (DLL) or a Static Link Library. In another embodiment of the present invention, the first content may comprise other program file, such as a class file and so on. For the purpose of convenience, description is presented in the following embodiments with the first content being a library file by way of example.

In one embodiment of the present invention, the memory is physical memory. However, those skilled in the art would appreciate that the development of technology the memory might have more meanings. In the embodiments of the present invention, a content loaded to the memory mainly refers to a content that will affect the running of a process if being patched. In one embodiment of the present invention, whether or not a to-be-patched content is in the memory may be judged by judging whether an application that will be mapped to the to-be-patched content is running or not.

In one embodiment of the present invention, the method shown in FIG. 2 may be applied to physical machine. In another embodiment of the present invention, the method shown in FIG. 2 may be applied to virtual machine.

In one embodiment of the present invention, the method shown in FIG. 2 may further comprise: learning that there is a need to patch the first content; and determining that the first content is in the memory. There may be various approaches to learning that there is a need to patch the first content, for example, receiving a notification, or directly receiving a push to patches, or directly receiving a control command. Also in the prior art there are various methods for determining that the first content is in the memory. Embodiments shown in FIGS. 3a and 3b also provide corresponding examples, which is not detailed here.

In one embodiment of the present invention, the first content comprises a library file. Accordingly, the distinguishing between a new content and an old content in step 210 comprises: distinguishing between the new content and the old content by modifying a library file list. There are various implementations; for example, an item related to an old content in the library file list may be modified, or an item related to a new content in the library file list may be modified.

In one embodiment of the present invention, the method shown in FIG. 2 may further comprise: after all old processes have exited, removing an item related to the old content, wherein the old processes comprise a process that has been mapped to the old content before the new content is loaded to the memory. Specifically, an item related to the old content in the library file list may be deleted, the old content among contents may be cleared, or both an item related to the old content in the library file list is deleted and the old content among contents is cleared.

Figure 3A:
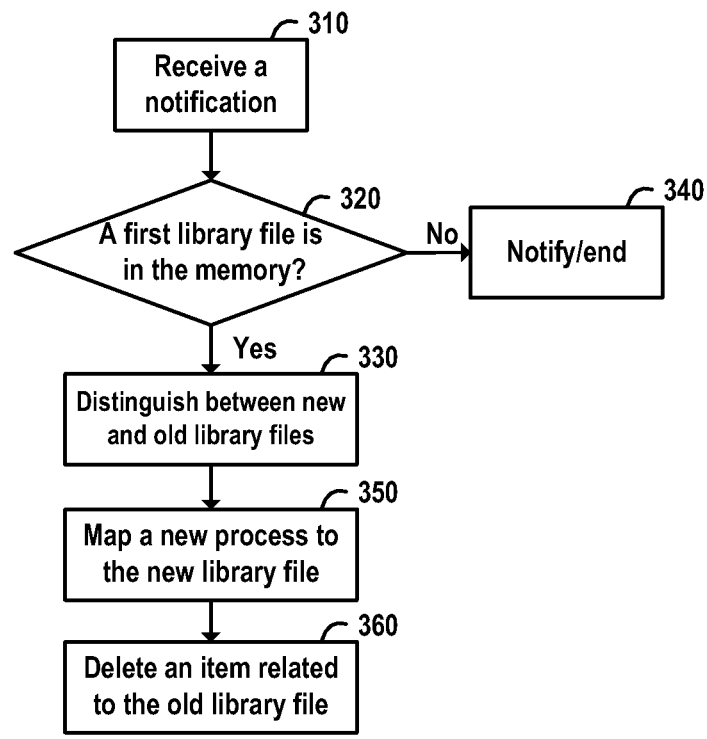
FIG. 3a shows a schematic flowchart of a method for patching as executed by a library file manager according to embodiments of the present invention.

In one embodiment of the present invention, the method shown in FIG. 2 may be implemented by a library file manager. As shown in FIG. 3a, in step 310, the library file manager receives a notification, which is for notifying the library file manager that there is a patch for a first library file. The notification is sent by patch agency by way of example. In step 320, the library file manager judges whether the first library file is already in the memory or not. If yes, then the method proceeds to step 330; if not, the method proceeds to step 340. In step 330, the library file manager distinguishes between the patched first library file and the unpatched first library file. For the purpose of facilitating description below, the patched first library file is called a new library file, and the unpatched first library file is called an old library file. In step 350, if a new process is started, then the new process is mapped to the new library file. The new process is a process that is started after the new library file is loaded to the memory, and an old process is a process that is mapped to the old library file before the new library file is loaded to the memory. In step 360, if all processes mapped to the old library file have exited, then an item related to the old library file is deleted. In step 340, the method may end directly, or other means is notified that the first library file is not in the memory. In this embodiment, the loading the new library file to the memory may be implemented by the operating system or other means before, concurrently with or after step 330, so long as it is after step 320 and before step 350.

Figure 3B:
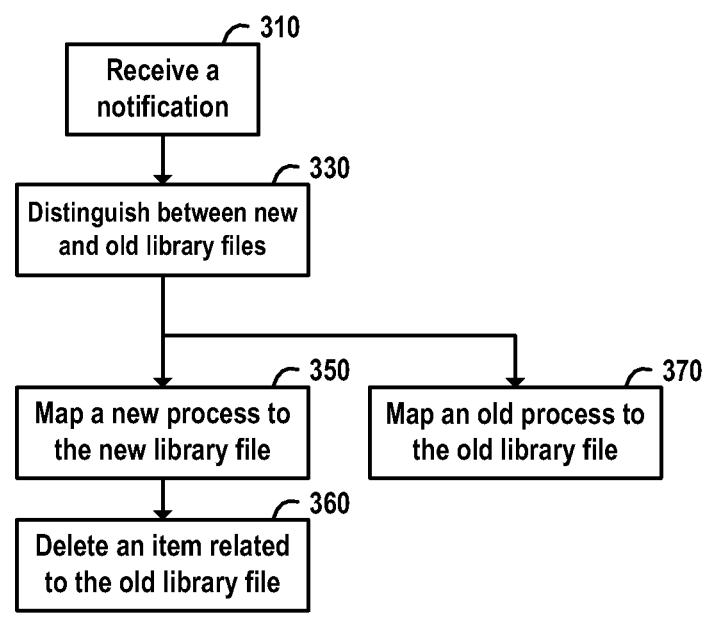
FIG. 3b shows a schematic flowchart of another method for patching as performed by a library file manager according to embodiments of the present invention.

In another embodiment of the present invention, as shown in FIG. 3b, the notification received in step 310 may be a notification for notifying the library file manager of information on a new library file, for example, including a memory address, a name of the new library file, etc. The notification may be sent by the operating system or other means by way of example. In this embodiment, the judging whether the library file is already in the memory or not is completed before step 310, specifically by the library file manager, or the operating system, or other means. In step 330, the library file manager may distinguish between the new library file and the old library file by modifying the library file list. In this embodiment, the library file manager maintains the library file list, the list comprising information related to library files and mapping relationships between library files and processes, wherein the information related to library files comprises, for example, names of library files, memory addresses, etc. Alternatively, the library file manager may distinguish between new and old library flies by modifying a name of the new library file in the library file list. In step 370, for the old process, the library file manager still maps it to the old library file so as to ensure normal running of the process. In step 360, the deleting an item related to the old library file may comprise deleting all or at least part of items of the old library file in the library file list. Alternatively, the old library file in the memory may be cleared. As seen from the embodiments shown in FIGS. 3a and 3b, the technical solution provided by the embodiments of the present invention may perform patching operations while ensuring that the running of the old process is not affected, so that the new process may use the patched content, i.e., achieving dynamic patching. This technical solution may improve the user experience and ensure duly patching. Moreover, the embodiment shown in FIG. 3b may prevent the old process from affecting the new library file when exiting. Further, this embodiment and the embodiment shown in FIG. 3a may refer to each other, for example, the embodiment shown in FIG. 3a may also comprise step 370.

Figure 3C:
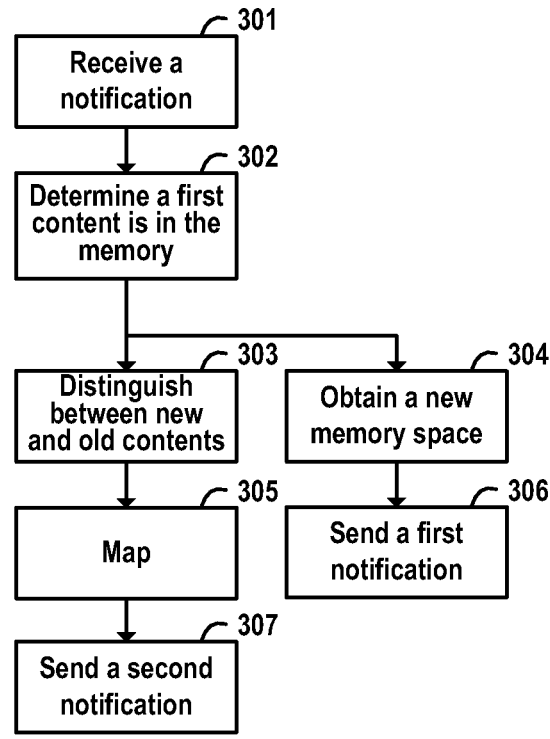
FIG. 3c shows a schematic flowchart of a method for patching applied in a virtual machine environment according to embodiments of the present invention.

As shown in FIG. 3c, when the above embodiment is implemented in a virtual machine environment, there may be further comprised: in step 301 virtual machine receives a notification of patching a first content; in step 302, in response to receipt of the notification, the virtual machine determines that the first content is already in the memory; in step 303, in response to determining that the first content is already in the memory, the virtual machine distinguishes between an old content and a new content; in step 304, a new memory space is obtained for saving the patched first content; in step 305, in response to the new content being loaded to the new memory space, the virtual machine maps to the new content a new process that needs to apply the first content; in step 306, a first notification is sent, the first notification at least comprising an address of the new memory space; in step 307, a second notification is sent, the second notification being for indicating that this virtual machine is already in a first state, the first state comprising any state from loading the patched first content to the new memory space till completing the patching operation. Those skilled in the art would appreciate that there is no specific execution order between step 303 and step 304; also there is no specific execution order among step 305, step 306 and step 307, so long as step 305 and step 307 are executed after the patched first content is loaded to the memory space. A concrete technical solution of virtual machine sharing memory may refer to details described with reference to the following embodiments, which is not detailed here. With the solution provided by this embodiment, a plurality of virtual machine may achieve memory sharing while patching, thereby saving the memory space and avoiding duplicated downloading of patches; moreover, dynamic patching is enabled without stopping running processes.

Figure 4:
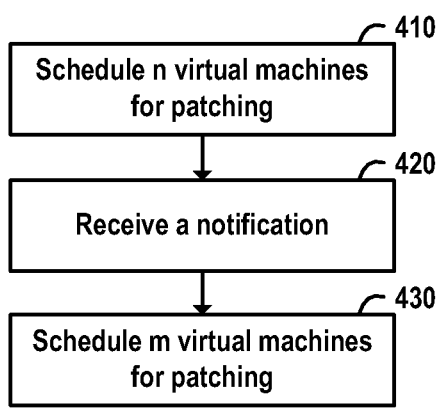
FIG. 4 shows a schematic flowchart of a method for patching applied to virtual machines according to embodiments of the present invention.

As shown in FIG. 4, the embodiment of the present invention provides a method for patching. The method is suitable to perform the patching operation for a virtual machine. The method comprises: step 410 of, in response to the number of virtual machines that need to patch a first content being more than 1, scheduling patching so that n virtual machines among the virtual machines first perform the operation of patching the first content, wherein the virtual machines that need to patch the first content are located on the same physical machine, and the number of the virtual machines that need to patch the first content is n+m, both n and m are natural numbers; step 420 of receiving a notification, the notification being for indicating at least one of the n virtual machines is already in a first state, wherein the first state comprises any state from loading the patched first content to a memory space until completing the patching operation; step 430 of, in response to receipt of the notification, scheduling at least one of m virtual machines other than the n virtual machines to perform the operation of patching the first content, so that at least one of the m virtual machines can use the patched first content, which is loaded to the memory, for the patching operation.

In the prior art, when a plurality of virtual machines perform patching, since these virtual machines are separated from each other, each virtual machine performs the patching operation independently without any collaboration with other virtual machines. As a result, patches are downloaded repeatedly, which increases the network transmission load and deteriorates the network transmission condition or slows down the I/O interface response. Moreover, since a plurality of virtual machines perform the patching operation independently, they might occupy several memory spaces for saving the same patched contents, which wastes the memory space. The method provided by this embodiment may schedule a plurality of virtual machines requiring patching to bring collaboration among virtual machines, thereby reducing the possibility that virtual machines repeatedly download patches, and alleviating the network transmission burden. In addition, by causing n virtual machines to perform patching first and then causing at least one of m virtual machines to perform patching by using the patched content in the memory, a virtual machine that performs patching subsequently can use a memory space occupied by a virtual machine that performs patching previously, thereby avoiding the memory space waste; that is, a plurality of virtual machines can share the memory occupied by patched contents. The method provided by this embodiment is applicable to dynamic patching or static patching.

In one embodiment of the present invention, alternatively the value of n is 1. That is, 1 virtual machine will be first scheduled to perform patching, and subsequently other virtual machines perform patching by using the patched content that has been loaded to the memory. In this manner, the benefit from sharing patched contents between virtual machines can be reflected to a greater extent.

In one embodiment of the present invention, the method as shown in FIG. 4 further comprises: determining that the number of virtual machines that need to patch the first content is more than 1, wherein the virtual machines that need to patch the first content comprise a virtual machine that is running a process mapped to the unpatched first content. With the method provided by this embodiment, virtual machines may achieve dynamic patching. Concrete implementation details may refer to the embodiments shown in FIGS. 2, 3a and 3b. It is to be understood that in a virtual machine environment, a judgment as to whether a to-be-patched content is in the memory or a virtual machine is running a process mapped to a to-be-patched content may be made by the patch manager or the patch agency on the virtual machine.

In one embodiment of the present invention, in steps 410 and 430, by different indications n and m virtual machines may be scheduled to perform patching respectively, so that n virtual machines obtain a new memory space while m virtual machines use the existing memory space. Alternatively, the approaches to scheduling in steps 410 and 430 are the same, i.e., the virtual machine judges whether to obtain a new memory space or use the existing memory space.

In one embodiment of the present invention, the first state comprises one of: load the patched content to the memory space; obtain a new client memory page; map the new client memory page to the new memory space; and map the new process to the patched content.

In one embodiment of the present invention, with reference to the embodiment shown in FIG. 2, the scheduling in step 430 may be implemented by sending a notification of patching, directly pushing a patch or directly sending a control command, which is not detailed here.

In one embodiment of the present invention, the method shown in FIG. 4 may be executed by a patch manager. The patch manager is for scheduling respective virtual machines to perform patching. Alternatively, the patch manager may send a notification of patching to the patch agency in the virtual machine. Alternatively, the patch manager may directly push a patch address to the patch agency in the virtual machine. Accordingly, the patch manager may directly receive a notification of patching and download a patch by itself or directly obtain an address where a patch is saved. In this embodiment, the patch address may be an address in the diskette or an address in the memory. For virtual machine applications, the memory may be physical memory in a physical machine or embodied as physical memory of the virtual machine hypervisor. Alternatively, the patch manager may be arranged in the operating system of a physical machine or in the virtual machine hypervisor running on a physical machine. Those skilled in the art would appreciate that with the development of technology, the patch manager may be arranged at other place, so long as it can schedule respective virtual machines to perform patching.

Figure 5:
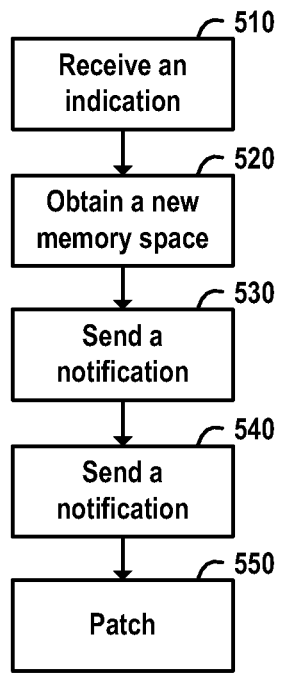
FIG. 5 shows a schematic flowchart of another method for patching applied to virtual machines according to embodiments of the present invention.

As shown in FIG. 5, one embodiment of the present invention provides a method for patching. The method is suitable to perform the patching operation for a virtual machine. The method comprises: in step 510 receiving an indication for notifying that a current virtual machine needs to patch; in step 520 obtaining a new memory space for saving a patched first content, the new memory space comprising a memory space that does not overlap with a memory space where the unpatched first content is saved; in step 530 sending a first notification that at least comprises an address of the new memory space; in step 540 sending a second notification for indicating that the current virtual machine is in a first state, the first state comprising any state from loading the patched first content to the memory space until completing the patching operation; and in step 550 performing the patching operation for the current virtual machine according to the patched first content in the new memory space.

According to the method provided by the embodiment of the present invention, after the virtual machine loads the patched content to the memory, the virtual machine notifies the patch manager so that the patch manager may schedule other virtual machines to perform patching. This helps to achieve patching collaboration among a plurality of virtual machines, thereby achieving memory sharing, avoiding duplicated downloads of patches and also avoiding occupation of too much memory space.

In one embodiment of the present invention, corresponding to the embodiment shown in FIG. 4, the indication received in step 510 may indicate that the current virtual machine needs to obtain a new memory space, or simply indicate that the current virtual machine needs to patch the first content, such that the virtual machine itself judges whether to obtain a new memory space.

In one embodiment of the present invention, the indication received in step 510 is an indication sent by first means. The first notification sent in step 530 is sent to second means. The second notification sent in step 540 is sent to third means. Both the first means and the third means are patch managers for scheduling virtual machines to perform patching; and the second means is a patch controller for managing the new memory space. Alternatively, the patch controller may be used for saving an address of the new memory space. Such a virtual machine, especially patch agency in the virtual machine may obtain an address of the new memory space by accessing the patch controller. Alternatively, the patch controller may be used for communicating with the virtual machine and managing the address of the new memory space. In this manner, the patch controller may manage addresses of a plurality of new memory spaces and respond to a variety of requests. Those skilled in the art would appreciate that the patch manager and the patch controller may be located in the same apparatus or be two separate means. Alternatively, the patch controller may be arranged in the hypervisor, which facilitates the management of memory spaces.

In one embodiment of the present invention, step 520 may, for example, comprise: in response to the first content being in the memory space, obtaining a new memory space for saving the patched first content. In this embodiment, a new memory space may be obtained where the first content is already in the memory. In another embodiment of the present invention, the determining whether or not the first content is in the memory space is implemented before downloading a patch, thus in response to the first content not being in the memory space, the patch may be directly downloaded to the diskette. In another embodiment of the present invention, the determining whether or not the first content is in the memory space is implemented after downloading a patch to the diskette, thus in response to the first content not being in the memory space, no operation is perform temporarily until a process needs to be mapped to the content, a memory space is obtained for saving the patched content, i.e., the patched content is directly loaded from the diskette to the memory. Step 550 may comprise: obtaining a new client memory page; mapping the new client memory page to the new memory space; and map to the patched first content the new process that needs to apply the first content, wherein the new process comprises a process that is started after mapping the new client memory page to the new memory space. The obtaining a new client memory page may be allocating a new memory space or learning a new memory space allocated to the current virtual machine. In this embodiment, the client memory page may be implemented in the form of a table in which mapping relationships between memories of virtual machines and physical addresses managed by the virtual machine hypervisor are maintained. With the method provided by this embodiment, when the virtual machine is running a process mapped to a patched content, the content may be patched still and the patched content is loaded to the memory, so that a new process may use the patched content and an old process still uses an old content. In this manner, dynamic patching is achieved without affecting the running of an old process.

In one embodiment of the present invention, the method shown in FIG. 5 further comprises: after all old processes have exited, removing an item related to the first content, wherein the old processes comprise a process that has been mapped to the unpatched first content before mapping the new client memory page to the new memory space. With the method provided by this embodiment, after an old process has exited, an item related to an old content may be cleared in time without affecting a new content.

In one embodiment of the present invention, the method shown in FIG. 5 is executed by the patch agency deployed in the virtual machine. Those skilled in the art would appreciate that part of functions may be accomplished by other means, the patch manager for example.

Figure 6:
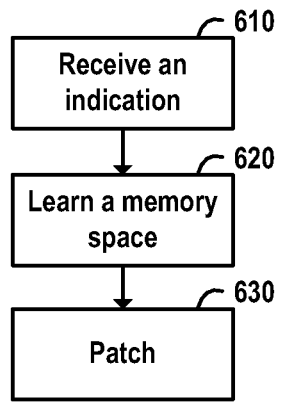
FIG. 6 shows a schematic flowchart of a further method for patching applied to virtual machines according to embodiments of the present invention.

As shown in FIG. 6, the embodiments of the present invention provide a method for patching. The method is suitable to perform patching for a virtual machine. The method comprises: in step 610 receiving an indication for notifying that a current virtual machine needs to patch; in step 620 learning a memory space for saving a patched first content, wherein the learned memory space is a memory space that is allocated to other virtual machine on the same physical machine as the current virtual machine; and in step 630 performing patching for the current virtual machine according to the patched first content saved in the learned memory space.

With the method provided by this embodiment, the virtual machine applying the method may share with a patched virtual machine a memory space where the patch is located, thereby avoiding duplicated downloads of the patch and also avoiding occupation of too much memory space.

In one embodiment of the present invention, corresponding to the embodiment shown in FIG. 4, the indication received in step 610 may indicate that the current virtual machine needs to use the existing memory space, or simply indicate that the current virtual machine needs to patch the first content, and the virtual machine itself judges whether to use the existing memory space.

In one embodiment of the present invention, the indication received in step 610 is sent by first means. The memory space learned in step 620 is a memory space learned from second means for saving the patched first content. Both the first means and the second means may be patch managers. In another embodiment of the present invention, the first means is a patch manager, and the second means is a patch controller.

In one embodiment of the present invention, step 630 may, for example, comprise: obtaining a new client memory page; mapping the new client memory page to the learned memory space; and mapping to the patched first content a new process that needs to apply the first content, wherein the new process comprises a process that is started after mapping the new client memory page to the learned memory space.

The above method embodiments may refer to each other and be combined with each other to obtain more embodiments. For example, the embodiments shown in FIGS. 4 and 2 may be combined to obtain a method of dynamic patching, executed by a patch manager, for virtual machines in case of memory sharing. For another example, the embodiments shown in FIGS. 6 and 2 may be combined to obtain a method of dynamic patching, executed by patch agency, for virtual machines in case of memory sharing.

Figure 7:
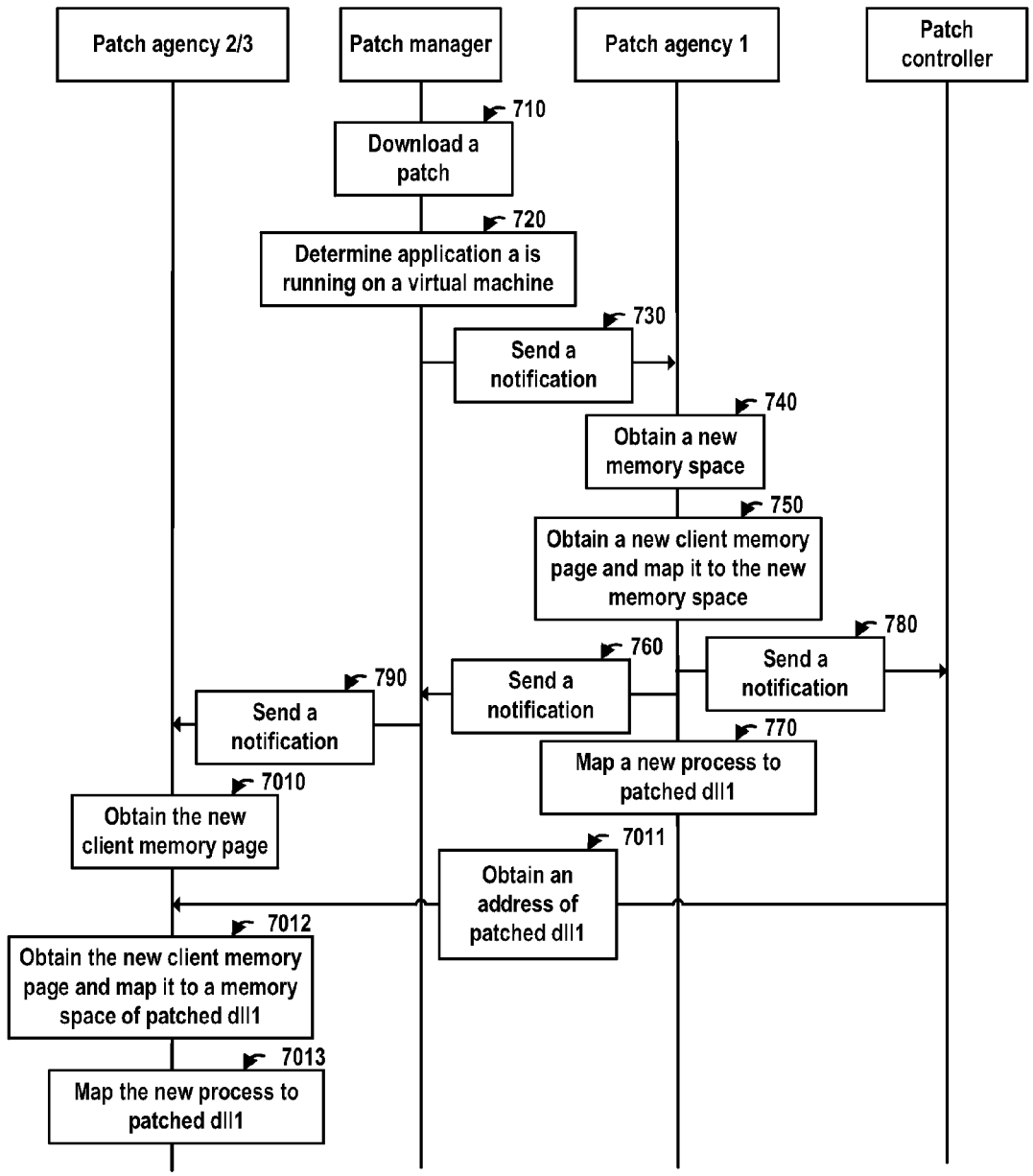
FIG. 7 shows a schematic flowchart of a still further method for patching applied to virtual machines according to embodiments of the present invention.

With reference to FIG. 7, detailed illustration is presented below to the embodiments of the present invention. On physical machine A, there are running virtual machine 1, virtual machine 2, virtual machine 3 and virtual machine 4. A patch manager arranged in the operating system of physical machine A learns that dll1 to which application "a" is mapped needs to be patched. In step 710, the patch manager downloads a patch of dll1 to the diskette. In step 720, the patch manager determines that application "a" is currently running on virtual machines 1, 2 and 3 but is not running on virtual machine 4. Application "a" is an application mapped to dll1. In step 730, the patch manager sends a notification of patching to patch agency 1 that is arranged on virtual machine 1. In step 740, in response to receipt of the notification of patching, patch agency 1 obtains a new physical memory space. In step 750, patch agency 1 obtains a new client memory page and maps it to the new physical memory space. In step 760, in response to patched dll1 being loaded to the new physical memory space, patch agency 1 sends a notification to the patch manager. In step 770, in response to patched dll1 being loaded to the new physical memory space, a new process is mapped to the new client memory page and then to patched dll1. In step 780, patch agency 1 notifies a patch controller of an address of the new physical memory space, i.e., an address of patched dill in the physical memory. In step 790, in response to receipt of the notification from patch agency 1, the patch manager sends a notification of patching to patch agency 2 arranged on virtual machine 1 and patch agency 3 arranged on virtual machine 3, respectively. In step 7010, in response to receipt of the notification of patching as sent from the patch manager, patch agency 2 and 3 each obtain the new client memory page. In step 7011, in response to receipt of the notification of patching as sent from the patch manager, patch agencies 2 and 3 each obtain from the patch controller the address of patched dll1 in the physical memory. In step 7012, the patch agencies 2 and 3 respectively map the new client memory page to a physical memory space that is occupied by patched dll1. In step 7013, patch agencies 2 and 3 map the new process to their respective new client memory pages and then to patched dll1.

In this embodiment, the loading the patched content to the new physical memory space may be implemented after, before or while patch agency 1 obtains the new physical memory space, so long as it is implemented after allocating the new physical memory space and before step 770. In this embodiment, there is no specific execution order between step 760 and step 770. Step 780 is executed after step 740 and before step 7011. Also, there is no specific execution order between step 7010 and step 7011. In this embodiment, the patch manager and the patch controller may be arranged together or at different locations. In this embodiment, step 720 may be determined by the patch manager itself or notified by a virtual machine. If being notified by a virtual machine, then the virtual machine itself judges whether or not dill is in the physical memory and may be executed by a library file manager. Further, step 770 may be executed by the library file manager by way of example, and before executing step 770, the library file manager may distinguish between old dll1 and new dll1. The concrete implementation may refer to the embodiment shown in FIG. 2. For the purpose of convenience in FIG. 7, the library file manager is not depicted separately, but the library file manager and the patch agency are depicted as a whole. In this embodiment, if application "a" is running, this necessarily means to-be-patched content 1 is in the physical memory. As such, whether to-be-patched content is in the physical memory may be determined by judging whether application "a" is running. Those skilled in the art would appreciate that other approaches may be taken for determining whether the to-be-patched content is in the physical memory or not. Other implementation details of this embodiment may also refer to the above embodiments. With the technical solution provided by this embodiment, virtual machines on the same physical machine may collaborate with each other in the operation of patching the same content, a content to which a running application is mapped may be patched without affecting an old process, and the patched content may be applied for a new process, thereby improving the user experience and increasing the security. In addition, since virtual machines may share the physical memory, they will not download the same patch repeatedly or occupy too much physical memory.

Figure 8:
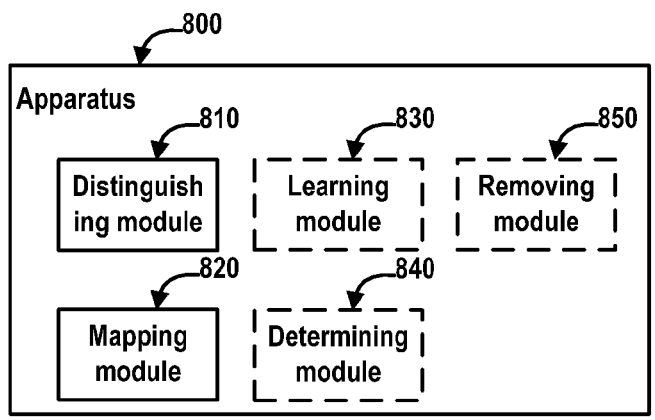
FIG. 8 shows a schematic diagram of an apparatus for patching according to one embodiment of the present invention.

As shown in FIG. 8, the embodiments of the present invention provide an apparatus 800 for patching. The apparatus 800 may be arranged in a physical machine environment or a virtual machine environment. The apparatus 800 comprises: a distinguishing module 810 configured to, in response to that there is a need to patch a first content and the first content has been already in the memory, distinguish between a new content and an old content, the new content being the patched first content, the old content being the first content that has been in the memory; and a mapping module 820 configured to, in response to that the new content is loaded to the memory, map to the new content a new process that needs to apply the first content, wherein the new process comprises a process that is started after the new content is loaded to the memory. The technical solution provided by this embodiment may achieve dynamic patching. Concrete implementation details of this embodiment may refer to a corresponding method embodiment, which are not detailed here. Alternatively, the apparatus 800 may be implemented as a library file manager by way of example.

In one embodiment of the present invention, the apparatus 800 may further comprise: a learning module 830 configured to learn that there is a need to patch the first content; and a determining module 840 configured to determine that the first content has been in the memory.

In one embodiment of the present invention, the first content comprises a library file by way of example. Accordingly, distinguishing module 810 is configured to distinguish between the new content and the old content by modifying a library file list.

In one embodiment of the present invention, the apparatus 800 may further comprise: a removing module 850 configured to remove an item related to the old content after all old processes have exited, wherein the old processes comprise a process that has been mapped to the old content before loading the new content to the memory.

Figure 9:
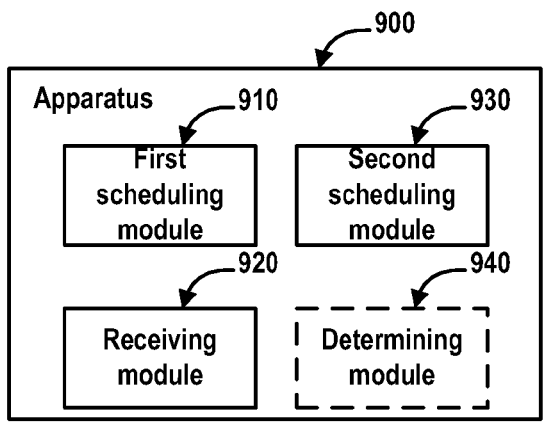
FIG. 9 shows a schematic diagram of another apparatus for patching according to embodiments of the present invention.

As shown in FIG. 9, the embodiments of the present invention provide an apparatus 900 for patching. The apparatus 900 may be arranged in a virtual machine environment. The apparatus 900 comprises: a first scheduling module 910 configured to, in response to that the number of virtual machines needing to patch a first content is more than 1, scheduling for patching so that n of the virtual machines first perform the operation of patching the first content, wherein the virtual machines needing to patch the first content are located on the same physical machine, and the number of the virtual machines needing to patch the first content is n+m, both n and m being natural numbers; a receiving module 920 configured to receive a notification for notifying that at least one of the n virtual machines is already in a first state, wherein the first state comprises any state from loading the patched first content to the memory until completing the patching operation; and a second scheduling 930 configured to, in response to receipt of the notification, schedule at least one of m virtual machines other than the n virtual machines to perform the operation of patching the first content, so that the at least one of the m virtual machines can perform the patching operation by using the patched first content that is loaded to the memory. Alternatively, the apparatus 900 may be implemented as a patch manager. Alternatively, the apparatus 900 may be located in the virtual machine hypervisor or in the operating system of the physical machine, so long as the location of the apparatus 900 can cause the apparatus 900 to communicate with a plurality of virtual machines that are located on the same physical machine. Those skilled in the art would appreciate that the apparatus 900 may further comprise more modules for fulfilling more functions, such as a function of patch downloading, a function of patch pushing, etc., which are not detailed here. With the technical solution provided by this embodiment, a plurality of to-be-patched virtual machines may achieve collaborative operation and share the memory so as to avoid repeatedly downloading patches and occupying too much memory.

In one embodiment of the present invention, a value of n is 1 by way of example.

In one embodiment of the present invention, the apparatus 900 further comprises: a determining module 940. The determining module 940 is configured to determine that the number of virtual machines needing to patch the first content is more than 1, wherein the virtual machines needing to patch the first content comprise a virtual machine that is running a process mapped to the first content which is not patched. With the technical solution provided by this embodiment, dynamic patching for virtual machines may be implemented, and concrete implementation details may refer to the embodiments shown in FIGS. 2, 3a and 3b.

Figure 10:
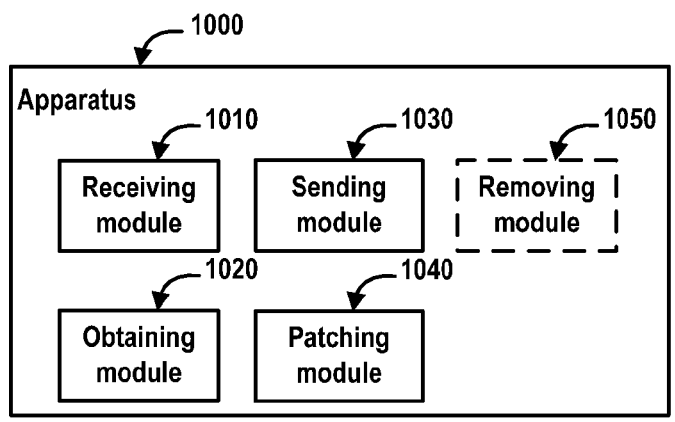
FIG. 10 shows a schematic diagram of a further apparatus for patching according to embodiments of the present invention.

As shown in FIG. 10, the embodiments of the present invention provide an apparatus 1000 for patching. The apparatus 1000 may be arranged in a virtual machine environment. The apparatus 1000 comprises: a receiving module 1010 configured to receive an indication for indicating that a current virtual machine needs to patch; an obtaining module 1020 configured to obtain a new memory space for saving a patched first content, the new memory space comprising a memory space that does not overlap with a memory space for saving an unpatched first content; a sending module 1030 configured to send a first notification at least comprising an address of the new memory space, and to send a second notification for notifying that the current virtual machine is already in a first state, the first state comprising any state from loading the patched first content to the memory space until completing the patching operation; and a patching module 1040 configured to perform the patching operation on the current virtual machine according to the patched first content in the new memory space. Alternatively, the apparatus 1000 may be implemented as a patch agency by way of example, which patch agency may be arranged in a virtual machine by way of example. With the technical solution provided by this embodiment, a plurality of to-be-patched virtual machines may achieve collaborative operation and share the memory so as to avoid repeatedly downloading patches and occupying too much memory.

In one embodiment of the present invention, receiving module 1010 may, for example, receive the indication from first means, and sending module 1030 may, for example, be configured to send the first notification to second means and send the second notification to third means. Both the first means and the third means are patch managers for scheduling virtual machines to perform the patching operation; and the second means is a patch controller for managing the new memory space. As seen from the description of the method embodiment, the patch managers and the patch controller may be arranged together or at different locations, for example, the patch managers are arranged in the operating system of a physical machine while the patch controller is arranged in the hypervisor.

In one embodiment of the present invention, obtaining module 1020 is configured to obtain a new memory space for saving the patched first content in response to that the first content has been in the memory. Patching module 1040 comprises: a client memory page sub-module configured to obtain a new client memory page; a first mapping sub-module configured to map the new client memory page to the new memory space; a second mapping sub-module configured to map to the patched first content a new process that needs to apply the first content, wherein the new process comprises a process that is started after mapping the new client memory page to the new memory space. With the technical solution provided by this embodiment, dynamic patching may be achieved on the basis of memory sharing between virtual machines. In conjunction with the embodiment shown in FIG. 9, those skilled in the art would appreciate that whether a process mapped to an unpatched content is running on a virtual machine may be judged by the patch agency on the virtual machine or by the patch manager.

In one embodiment of the present invention, the apparatus 1000 further comprises a removing module 1050 configured to, after all old processes have exited, remove an item related to the first content, wherein the old processes comprise a process that has been mapped to the unpatched first content before mapping the new client memory page to the new memory space.

Figure 11:
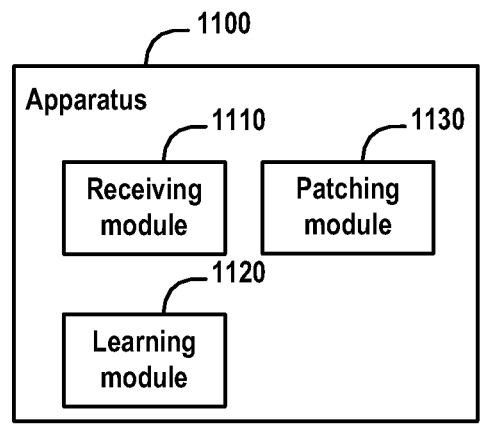
FIG. 11 shows a schematic diagram of a still further apparatus for patching according to embodiments of the present invention.

As shown in FIG. 11, the embodiments of the present invention provide an apparatus 1100 for patching. The apparatus 1100 may be arranged in a virtual machine environment. The apparatus 1100 comprises: a receiving module 1110 configured to receive an indication for indicating that a current virtual machine needs to patch; a learning module 1120 configured to learn a memory space for saving a patched first content, wherein the learned memory space is a memory space that is allocated to other virtual machine located on the same physical machine as the current virtual machine; and a patching module 1130 configured to perform the patching operation on the current virtual machine according to the patched first content in the learned memory space. Alternatively, the apparatus 1100 may be implemented as patch agency by way of example, which patch agency may be arranged in a virtual machine by way of example. With the technical solution provided by this embodiment, a plurality of to-be-patched virtual machines may achieve collaborative operation and share the memory so as to avoid repeatedly downloading patches and occupying too much memory.

In one embodiment of the present invention, patching module 1130, for example, comprises: a client memory page sub-module configured to obtain a new client memory page; a first mapping sub-module configured to map the new client memory page to the learned memory space; and a second mapping sub-module configured to map to the patched first content a new process that needs to apply the first content, wherein the new process comprises a process that is started after mapping the new client memory page to the learned memory space.

Figure 12:
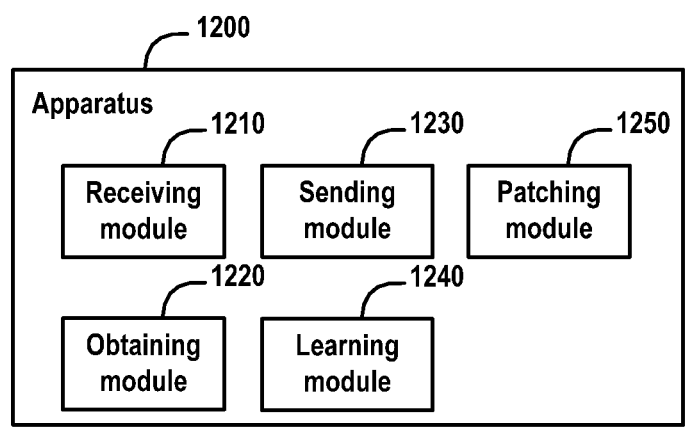
FIG. 12 shows a schematic diagram of a still further apparatus for patching according to embodiments of the present invention.

The above method embodiments may refer to each other and be combined with each other to obtain more implementations. For example, the embodiments shown in FIGS. 10 and 11 may be combined to obtain an apparatus 1200 for patching as shown in FIG. 12, which the apparatus 1200 may, for example, be arranged in a virtual machine. The apparatus 1200 comprises: a receiving module 1210 configured to receive a first indication for indicating that a current virtual machine needs to obtain a new memory space for patching a first content, and to receive a second notification for notifying that the current virtual machine needs to use the existing memory space for patching a second content; an obtaining module 1220 configured to, in response to receipt of the first indication, obtain a new memory space for saving a patched first content, the new memory space comprising a memory space that does not overlap with a memory space where an unpatched first content is saved; a sending module 1230 configured to send a first notification at least comprising an address of the new memory space, and to send a second notification for indicating the current virtual machine is already in a first state, the first state comprising any state from loading the patched first content to the memory space until completing the patching operation; a learning module 1240 configured to, in response to receipt of the second indication, learn a memory space for saving the patched first content, wherein the learned memory space is a memory space that is allocated to another virtual machine located on the same physical machine as the current virtual machine; and a patching module 1250 configured to perform the patching operation on the current virtual machine according to the patched content in the memory space obtained by obtaining module 1220 or in the memory space learned by learning module 1240.

Implementation details of the above apparatus embodiments may refer to corresponding method embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for patching an application running in a computer system having a processor device, the method comprising:

detecting, at the processor device, a need to patch a first content to at least one virtual machine running on a physical computing device;

scheduling, by the processor device, operations for patching said first content to each of the at least one virtual machines in response to detecting that the number of virtual machines needing to patch a first content is more than 1, said scheduling for patching providing that n of the virtual machines first perform the operation of patching the first content, wherein the virtual machines needing to patch the first content are located on the same physical computing device, and the number of the virtual machines needing to patch the first content is n+m, both n and m being natural numbers;

receiving, at the processor device, a notification for notifying that at least one of the n virtual machines is already in a first state, wherein the first state comprises any state from loading the patched first content to a memory storage device until completing the patching operation; and in response to receipt of the notification, scheduling, by the processor device, at least one of m virtual machines other than the n virtual machines to perform the operation of patching the first content, so that the at least one of the m virtual machines performs the patching operation by using the patched first content that is loaded to the memory storage device, and the first content is used without shutting the running application down.

2. The method according to claim 1, wherein n is equal to 1.

3. The method according to claim 1, wherein the method further comprises:

determining that the number of virtual machines needing to patch the first content is more than 1, wherein the virtual machines needing to patch the first content comprise a virtual machine that is running a process mapped to the first content which is not patched.

4. A method for patching an application running on a computer system having a processor device, the method comprising:

receiving, at the processor device, an indication for indicating that a current virtual machine needs to patch;

obtaining, by the processor device, a new memory space in a memory storage device for saving a patched first content, the new memory space comprising a memory space that does not overlap with a memory space for saving an unpatched first content;

sending, by the processor device, a first notification at least comprising an address of the new memory space;

sending, by the processor device, a second notification for notifying that the current virtual machine is already in a first state, the first state comprising any state from loading the patched first content to the memory space until completing the patching operation; and performing the patching operation on the current virtual machine according to the patched first content in the new memory space and using the patched first content without shutting the running application down.

5. The method according to claim 4, wherein the obtaining a new memory space for saving a patched first content comprises: in response to that the first content has been in the memory, obtaining a new memory space for saving the patched first content;

the performing the patching operation on the current virtual machine according to the patched first content in the new memory space comprises: obtaining a new client memory page; mapping the new client memory page to the new memory space; and mapping to the patched first content a new process that needs to apply the first content, where the new process comprises a process that is started after mapping the new client memory page to the new memory space.

6. The method according to claim 5, wherein the method further comprises:

removing an item related to the first content after all old processes have exited, wherein the old processes comprise a process that has been mapped to the unpatched first content before mapping the new client memory page to the new memory space.

7. An apparatus for patching, comprising:

a memory storage device;

a processor device coupled with the memory storage device, the processor device configured to:

in response to that the number of virtual machines needing to patch a first content is more than 1, schedule for patching so that n of the virtual machines first perform the operation of patching the first content, wherein the virtual machines needing to patch the first content are located on the same physical machine, and the number of the virtual machines needing to patch the first content is n+m, both n and m being natural numbers;

receive a notification for notifying that at least one of the n virtual machines is already in a first state, wherein the first state comprises any state from loading the patched first content to the memory storage device until completing the patching operation; and in response to receipt of the notification, schedule at least one of m virtual machines other than the n virtual machines to perform the operation of patching the first content, so that the at least one of the m virtual machines performs the patching operation by using the patched first content that is loaded to the memory storage device and using the patched first content without shutting the running application down.

8. The apparatus according to claim 7, wherein n is equal to 1.

9. The apparatus according to claim 7, wherein the processor device is further configured to:

determine that the number of virtual machines needing to patch the first content is more than 1, wherein the virtual machines needing to patch the first content comprise a virtual machine that is running a process mapped to the first content which is not patched.

10. An apparatus for patching, comprising:

a memory storage device;

a processor device coupled with the memory storage device, the processor device configured to:

receive an indication for indicating that a current virtual machine needs to patch;

obtain a new memory space for saving a patched first content, the new memory space comprising a memory space that does not overlap with a memory space for saving an unpatched first content;

send a first notification at least comprising an address of the new memory space, and to send a second notification for notifying that the current virtual machine is already in a first state, the first state comprising any state from loading the patched first content to the memory space until completing the patching operation; and perform the patching operation on the current virtual machine according to the patched first content in the new memory space and using the patched first content without shutting the running application down.

11. The apparatus according to claim 10, wherein to obtain, the processor device is further configured to, in response to that the first content has been in the memory, obtain a new memory space for saving the patched first content; and to perform the patching operation, the processor device is further configured to: obtain a new client memory page; map the new client memory page to the new memory space; and map to the patched first content a new process that needs to apply the first content, where the new process comprises a process that is started after mapping the new client memory page to the new memory space.

12. The apparatus according to claim 11, wherein the processor device is further configured to:
   remove an item related to the first content after all old processes have exited, wherein the old processes comprise a process that has been mapped to the unpatched first content before mapping the new client memory page to the new memory space.

13. A computer program product comprising: a non-transitory storage medium readable by a processing circuit and storing instructions for execution by the processing circuit for performing the method steps of claim 1 when said program is run on a computer.

\* \* \* \* \*